United States Patent [19]
Reed et al.

[11] 4,109,535
[45] Aug. 29, 1978

[54] DIAPHRAGM SEAL FOR PRESSURE SENSING INSTRUMENT

[75] Inventors: Charles J. Reed, South Euclid; Claren K. Cook, Aurora, both of Ohio

[73] Assignee: Ametek, Inc., New York, N.Y.

[21] Appl. No.: 721,437

[22] Filed: Sep. 8, 1976

Related U.S. Application Data

[63] Continuation of Ser. No. 526,610, Nov. 25, 1974, abandoned.

[51] Int. Cl.² .............................................. G01L 7/08
[52] U.S. Cl. ...................................... 73/706; 73/715; 92/102
[58] Field of Search ................ 92/98 R, 99, 100, 102; 73/406, 408, 706, 715

[56] References Cited

U.S. PATENT DOCUMENTS

| | | | |
|---|---|---|---|
| 2,339,876 | 1/1944 | Phillips | 92/98 R |
| 2,437,440 | 3/1948 | Rigden | 73/406 |
| 2,969,031 | 1/1961 | Yates | 92/98 R |
| 3,168,907 | 2/1965 | Mercier | 92/98 R |
| 3,566,750 | 3/1971 | Allen | 92/97 |
| 3,645,139 | 2/1972 | Zavoda | 92/102 |

FOREIGN PATENT DOCUMENTS 859,666  7/1949  Fed. Rep. of Germany .............. 92/102

Primary Examiner—Martin P. Schwadron
Assistant Examiner—Abraham Hershkovitz
Attorney, Agent, or Firm—Amster, Rothstein & Engelberg

[57] ABSTRACT

A pressure responsive diaphragm has on its periphery axially spaced annular projections to define a peripheral annular groove therebetween which receives an annular projection at the coupling surface of a coupling flange. The diaphragm is thus releasably retained on the coupling flange and encloses a recess formed in the flange which recess communicates with the instrument. A compressible sealing ring for the recess within the flange is positioned on the peripheral surface of an annular projection of the diaphragm. The diaphragm may also be provided with an axially extending annular projection which is received in a corresponding axially opening groove formed in the coupling flange. A compressible sealing O-ring may be positioned within this axially opening groove radially outwardly of the diaphragm projection or may be positioned on the peripheral edge of the second annular projection of the diaphragm and arranged so that the O-ring contacts two or three metal walls of the coupling flange.

3 Claims, 3 Drawing Figures

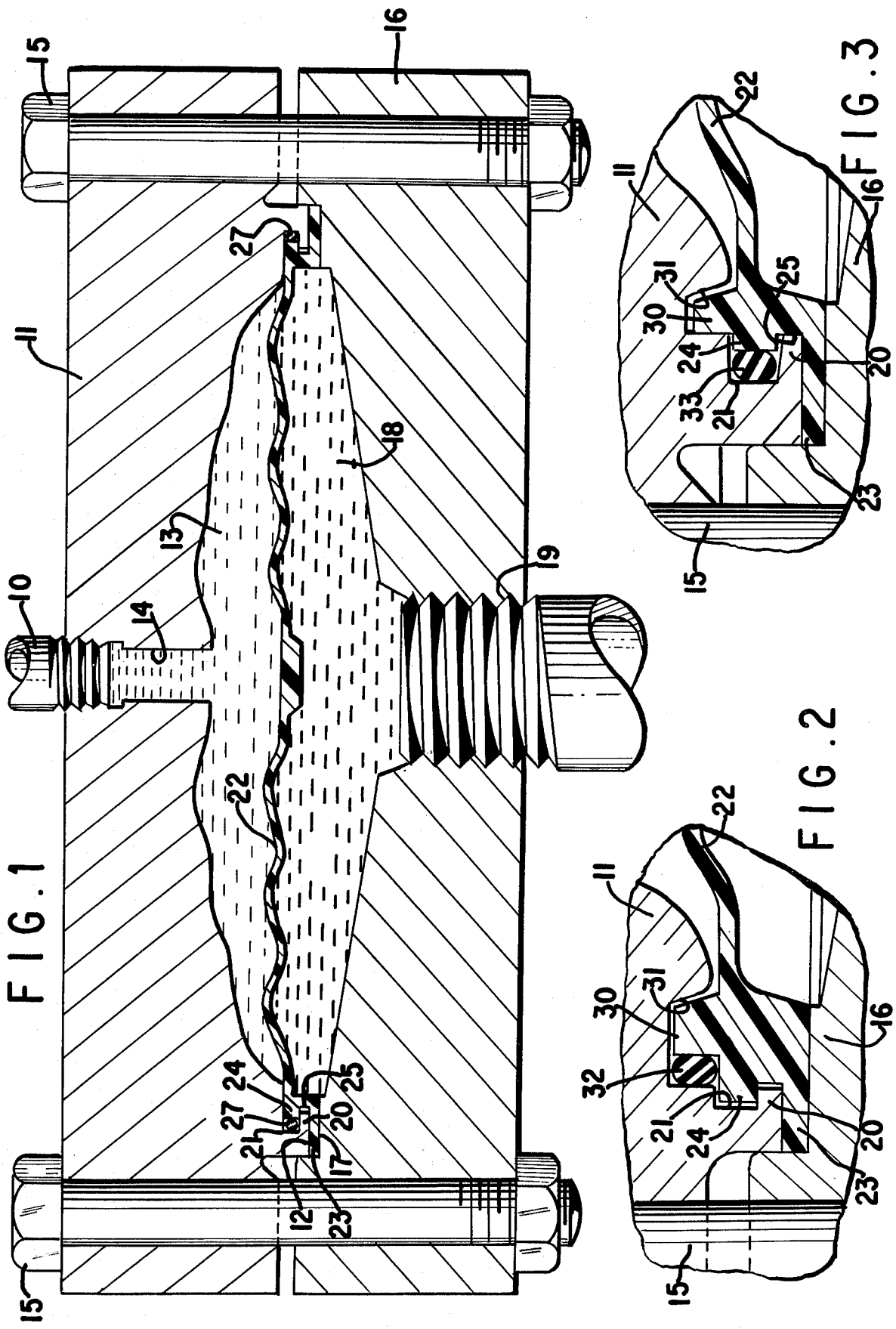

DIAPHRAGM SEAL FOR PRESSURE SENSING INSTRUMENT

This is a continuation of application Ser. No. 526,610, filed Nov. 25, 1974 and now abandoned.

The present invention relates to an instrument for recording or indicating pressure and, more particularly, to a diaphragm seal for such an instrument.

Many forms of instruments have been developed for monitoring pressure values. Such values are sensed by suitable indicating gauges or recording instruments which are mounted on various process vessels or on flow lines. Such pressure sensing is of particular value in the various chemical processing industries wherein various liquids, gases or slurries are maintained under vacuum or under pressure either in closed vessels or flow conduits. In most chemical processes and in many other processes as well, it is desirable to isolate the pressure sensing means of the instrument from the process material. This is desirable when the material which is in liquid or gas form is of a clogging or corrosive nature which could render the pressure instrument inoperative. It may also be desirable to isolate the instrument where strong pulsations are present in the process and these pulsations sometimes cannot be readily subdued with a snubber because of the high viscosity of the material.

Such isolation of the instrument has conventionally been accomplished by providing a coupling flange on the instrument which is attached in abutting relationship to a process flange member, such as seen, for example, in Zavoda U.S. Pat. No. 3,645,139. Both of the flanges have a recess or cavity therein and a flexible diaphragm is mounted so as to partition or separate the instrument or coupling flange recess from the recess in the process flange. Such sealing is further enhanced by providing a compressible sealing ring or gasket at the peripheral edges of the diaphragm and only in contact with or confined by one metal wall or when contacted by two metal walls, the O-ring is not supported on one side thereof. Accordingly, the coupling flange is provided with a suitable configuration which mates with a corresponding configuration on the periphery of the seal and the compressible sealing ring or gasket is interposed in what is deemed to be the optimum sealing position between the mating configurations of the diaphragm and the flange coupling. While such combinations of configurations and compressible sealing rings or gaskets have been generally satisfactory, they have entailed relatively complicated structures in order to achieve the desirable sealing effect. Because of the cold flow characteristics of materials, sealing difficulties can arise. As a result, this position of the instrument has greatly increased the cost of both manufacturing and assembling the diaphragm.

One of the objects of the invention is to provide an improved diaphragm assembly for a pressure sensing instrument.

Another of the objects of the invention is to provide an improved sealing structure between the peripheral portion of the diaphragm and the mating portion of the coupling flange in such a pressure sensing instrument.

According to one aspect of the present invention, a diaphragm assembly for a pressure sensing instrument may comprise a coupling flange having a coupling surface and a recess in the coupling surface in communication with the instrument. There is an annular projection on the coupling flange at the coupling surface thereof and extending inwardly into the recess so as to define an annular groove adjacent the projection. A pressure responsive diaphragm has a peripheral annular groove so as to define a first annular projection on one side of the groove and a second annular projection on the other side of the groove. The flange annular projection is received within the diaphragm annular groove so as to releasably retain the diaphragm on the coupling flange. A compressible sealing ring is positioned within the flange annular groove on the peripheral surface of the diaphragm second annular projection. The seal ring is held completely entrapped by at least two metal walls of the flange and preferably by three metal walls.

The diaphragm may also be formed with an annular projection which extends axially into a corresponding axially opening annular groove in the flange coupling. The compressible sealing ring may be positioned within this flange coupling groove radially outwardly of the diaphragm axially extending annular projection.

Other objects, advantages and features of the present invention will become apparent from the accompanying description and drawings, which are merely exemplary.

In the drawings:

FIG. 1 is a transverse sectional view of a pressure sensing instrument incorporating the diaphragm seal assembly of the present invention;

FIG. 2 is a view in enlarged scale of a portion of FIG. 1 showing an edge of the diaphragm in enlarged scale and illustrating a modification thereof; and FIG. 3 is a view similar to that of FIG. 2 and showing a further modification.

Proceeding next to the drawings wherein like reference symbols indicate the same parts throughout the various views, a specific embodiment and modifications of the present invention will be described in detail.

As may be seen in FIG. 1, a conventional pressure sensing gauge or instrument has an external threaded extension 10 which is connected to an instrument coupling flange 11 having a coupling surface 12 and a recess or cavity 13 formed in the coupling surface. Recess 13 communicates with the extension 10 by means of a passage 14. The coupling flange 11 is secured in abutting relationship by means of bolts 15 with a process flange member 16 similarly having a coupling surface 17 and a recess 18 formed therein. The process flange recess 18 is connected to a process flow line or vessel through an internally threaded opening 19.

At the coupling surface 12 of the flange coupling 11, annular projection 20 extends inwardly into the recess 13 so as to define an annular groove 21.

A circular pressure responsive flexible diaphragm 22 is mounted in the coupling flange 11 so as to provide a partition between the recesses 13 and 18. As shown in FIG. 1, the diaphragm has a central or body portion of a corrugated or suitable cross section so as to enhance the flexibility and displacement characteristics of the diaphragm. The diaphragm is preferably molded as a single unitary structure using a suitable plastic material which has the necessary chemical and physical properties for optimum performance of the diaphragm. One example of a suitable material is "Teflon," the trademark of E. I. DuPont de Nemours & Co. for its brand of polytetrafluoroethylene. "Teflon" has been found to have the desirable creep, cold flow and flexibility characteristics. The diaphragm, however, may also be formed partially of metal, rubber or other composite materials, depending upon the particular application intended for the instrument.

The peripheral edge of the diaphragm 22 is formed with a first annular projection 23 and a second annular projection 24 so as to define therebetween an annular groove 25. The annular projection 20 of the coupling flange 11 is received within the annular groove 25 of the diaphragm 22 between its adjacent annular projections 23 and 24. This construction enables the diaphragm 22 to be held on the coupling flange 11 but to be releasable therefrom.

The shoulder 24 of the diaphragm is received within an annular groove 21 formed within the coupling flange 11 immediately adjacent the annular projection 20. A compressible sealing member which may be in the form of an O-ring 27 or similar seal is positioned on the peripheral edge of the diaphragm shoulder 24 within the groove 21. This compressible ring 27 together with the mating configuration of the peripheral edge of the diaphragm 22 and the coupling flange 11 provide a relatively simple but reliable sealing structure. The O-ring 27 is entrapped in groove 21 and contacts three metal walls of flange 11 and is supported on the fourth side by projection 24 of the diaphragm.

The annular projection 23 of the diaphragm serves as a gasket between the coupling flanges 11 and 16. The coupling flanges 11 and 16 preferably are of metal or similar substantially unflexible material. Flanges 11 and 16 are separated by a gap on the opposing surfaces adjacent to the bolts 15. Bolt securing forces thus are applied directly to the gasket sealing surfaces adjacent to the diaphragm annular projection 23.

As shown in FIG. 2, the inner surface of the diaphragm 22 with respect to the inner flange recess 13 may be provided with an axially extending annular projection 30 which is received in a corresponding axially opening annular groove 31 formed in the coupling flange 11. A compressible sealing ring 32 is positioned within the groove 31 radially outwardly of the axial projection 30. The O-ring is entrapped between two metal walls and the diaphragm. In this form, the diaphragm annular projection 24 releasably retains the diaphragm on the coupling flange 11, while the compressible sealing ring 32 is positioned between the axially opening annular groove 31 and the axially extending annular projection 30, thus improving the sealing and retention properties.

In the modification of FIG. 3, the inner surface of the diaphragm 22 with respect to the inner flange recess 13 may be provided with an axially extending annular projection 30 which is received in a corresponding axially opening annular groove 31 formed in the coupling flange 11. A compressible sealing ring 33 is positioned within the annular groove 21 on the peripheral surface of the diaphragm annular projection 24. In this form the diaphragm shoulder 24 is imparted additional rigidity, thus improving the sealing properties of the sealing ring 33.

Thus, it can be seen that the present invention has disclosed a simple but reliable sealing structure between the peripheral edge of a pressure responsive diaphragm and its mounting surface in the coupling flange attached to a pressure sensing instrument.

It will be understood that various details of construction and arrangement of parts may be made without departing from the spirit of the invention except as defined in the appended claims.

What is claimed is:

1. In a diaphragm assembly device for connecting a source of pressure to a pressure sensing instrument, the combination of a pressure responsive diaphragm consisting essentially of fluorocarbon resins a coupling flange having a coupling surface and a coupling flange recess in said coupling surface, means for connecting said recess with a pressure responsive instrument, an annular flange projection on said coupling flange at the coupling surface thereof and extending inwardly into said recess to define a first annular flange groove adjacent said projection and opening radially toward said diaphragm, a second annular flange groove formed in said flange inwardly of said first annular flange groove and opening axially toward said diaphragm, said diaphragm having a peripheral annular diaphragm groove therein defining a first annular diaphragm projection on one side thereof and a second annular diaphragm on the other side thereof, said flange projection being receivable within said diaphragm groove for releasably retaining said diaphragm on said coupling flange, a third annular projection on said diaphragm extending axially and being receivable within said second annular flange groove, a compressible sealing ring positioned in said first annular flange groove and peripherally contacting said diaphragm, said sealing ring being entrapped between at least three walls of said flange and said diaphragm, and a process flange means connected to said coupling flange and having a surface spaced therefrom, said process flange means having a connection with a source of pressure to be sensed, said first annular diaphragm projection positioned between the coupling surface of said coupling flange and said surface of said process flange so as to grip said first annular diaphragm projection therebetween.

2. In a diaphragm assembly device for connecting a source of pressure to a pressure sensing instrument, the combination of a coupling flange having a coupling surface and a recess in said coupling surface, means for connecting said recess with a pressure responsive instrument, and an annular projection on said coupling flange at the coupling surface thereof and extending inwardly into said recess to define an annular groove above said projection, a pressure responsive diaphragm having a peripheral annular groove therein defining a first annular projection therebelow and a second annular projection above said last mentioned groove, said flange annular projection being receivable within said diaphragm annular groove for releasably retaining said diaphragm on said coupling flange, there being an annular groove in said coupling flange opening axially toward said diaphragm above and spaced inwardly of said first mentioned annular groove, an annular projection on said diaphragm spaced inwardly of said second annular projection and extending axially and receivable in said flange axially opening annular groove, a compressible sealing ring within said flange axially opening annular groove and engageable with the second annular projection of said diaphragm, and a process flange means connected to said coupling flange and having a surface spaced therefrom, said process flange means having a connection with a source of pressure to be sensed, said first annular projection of said diaphragm being between the coupling surface of said coupling flange and said surface of said process flange so as to grip said first annular projection therebetween.

3. In a diaphragm assembly as claimed in claim 2 wherein said sealing ring is positioned radially outwardly of said diaphragm axially extending annular projection.